(12) United States Patent  
Wik et al.

(10) Patent No.: US 7,969,645 B2  
(45) Date of Patent: Jun. 28, 2011

(54) VARIABLE LENS

(75) Inventors: Daniel Wik, Lidingo (SE); Anders Ingemar Jahge, Taby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 142 days.

(21) Appl. No.: 12/394,400

(22) Filed: Feb. 27, 2009

(65) Prior Publication Data

US 2010/0220383 A1    Sep. 2, 2010

(51) Int. Cl.  
*G02F 1/29* (2006.01)

(52) U.S. Cl. ........ 359/319; 359/321; 359/159; 359/168; 359/204; 359/216; 359/665; 359/666; 362/277

(58) Field of Classification Search .............. 351/41, 351/158, 159, 168, 169, 177, 204, 205, 216; 359/319, 565, 574  
See application file for complete search history.

(56) References Cited

U.S. PATENT DOCUMENTS

| | | | | |
|---|---|---|---|---|
| 6,733,130 B2 * | 5/2004 | Blum et al. | .................. | 351/216 |
| 7,404,636 B2 * | 7/2008 | Blum et al. | .................. | 351/159 |
| 7,440,193 B2 * | 10/2008 | Gunasekaran et al. | ....... | 359/666 |
| 7,498,729 B2 * | 3/2009 | Ogino | .......................... | 310/330 |
| 7,521,847 B2 * | 4/2009 | Heim | ........................ | 310/313 R |
| 7,595,580 B2 * | 9/2009 | Heim | ............................ | 310/324 |
| 7,679,267 B2 * | 3/2010 | Heim | ............................ | 310/324 |
| 7,733,575 B2 * | 6/2010 | Heim et al. | .................... | 359/665 |
| 2002/0102102 A1 | 8/2002 | Watanabe et al. | | |
| 2010/0002190 A1 * | 1/2010 | Clarke et al. | .................. | 351/168 |

FOREIGN PATENT DOCUMENTS

| | | |
|---|---|---|
| DE | 38 42 199 A1 | 12/1988 |
| JP | 57139719 A | 8/1982 |
| WO | 02/091024 A2 | 11/2002 |
| WO | 2004/059364 A1 | 7/2004 |
| WO | 2005/085930 A1 | 9/2005 |
| WO | 2006/078806 A2 | 7/2006 |
| WO | 2007/090843 A2 | 8/2007 |

OTHER PUBLICATIONS

Micromuscle AB—Electroactive Polymer Technology for Life Science, www.micromuscle.com/technology/micromuscle (2007).  
An Improved Electroactive Polymer for Optical Applications, Proc. SPIE, 5385:449 (2004); DOI:10.1117,/12.538722.  
Al-Jumaily et al., Prospective Optical Electroactive Polymers, http://cat.inist.fr/?aModele=afficheN&cpsidt=15509165 (2003).  
Steven Ashley, Artificial Muscles, Scientific American, pp. 53-59(2003).

* cited by examiner

*Primary Examiner* — Loha Ben  
(74) *Attorney, Agent, or Firm* — Peter F. Corless; Steven M. Jensen; Edwards Angell Palmer & Dodge LLP

(57) ABSTRACT

A lens is provided, comprising a lens body. According to an embodiment, the lens body comprises at least one portion of electroactive material.

17 Claims, 3 Drawing Sheets

VARIABLE LENS

FIELD OF THE INVENTION

The present invention relates to variable lenses, lens arrangements comprising one or more such variable lenses and mobile devices comprising one or more such variable lenses.

BACKGROUND OF THE INVENTION

Optical elements having variable, i.e. controllable, optical properties are used in many applications. One example of such an optical element is a zoom lens arrangement, where the focal length and therefore the field of view is generally varied by moving individual lenses of the zoom lens arrangement relative to each other. Such zoom lens arrangements are for example used in photography.

Other optical elements with variable properties comprise variable reflectors, i.e. mirror arrangements comprising a plurality of individual mirrors at least some of which are movable to change the optical properties of the system. Such variable reflectors are for example used in flash devices for photography.

The above-mentioned conventional variable optical elements, depending on the implementations, may be comparatively bulky. On the other hand, for example in the field of photography an increasing miniaturization has taken place. For example, digital cameras including a flash light are often incorporated in mobile phones, with considerable space restraints.

Therefore, it would be desirable to have variable optical elements which are more compact than conventional elements.

SUMMARY OF THE INVENTION

According to an embodiment, a lens is provided comprising a lens body, said lens body comprising at least one portion of electroactive material.

According to an embodiment, said lens body may consist essentially of said electroactive material.

According to an embodiment, the lens may further comprise at least two electrodes configured to apply a voltage to said at least one portion of electroactive material.

According to an embodiment, said at least two electrodes may comprise at least one first electrode arranged on a first side of said lens body and a plurality of second electrodes arranged on a second side of said lens body, said second side being opposite said first side.

According to an embodiment, said at least two electrodes may be configured to control the shape of said at least one portion of electroactive material to form a Fresnel lens.

According to an embodiment, at least one electrode of said at least two electrodes may be selected from the group consisting of a mesh of electrical conductors and a transparent conductor.

According to an embodiment, said at least one portion of electroactive material may comprise an electroactive polymer.

According to another embodiment, a device is provided, comprising:
a lens, said lens comprising a lens body, said lens body comprising at least one portion of electroactive material, and at least two electrodes applied to said at least one portion of electroactive material,
said device further comprising a control unit coupled to said at least two electrodes and configured to apply a voltage to said at least two electrodes.

According to an embodiment, said control unit may be configured to shift an optical axis of said lens by applying a voltage to said at least two electrodes.

According to an embodiment, said control unit may be configured to form said lens to the shape of a Fresnel lens by applying a voltage to said at least two electrodes.

According to an embodiment, said at least two electrodes may comprise at least one first electrode arranged on a first side of said lens body and a plurality of second electrodes arranged on a second side of said lens body, said second side being opposite said first side.

According to an embodiment, the device comprises a lens arrangement, said lens arrangement comprising said lens and at least one further lens.

According to a further embodiment, an electronic device is provided, comprising: a lens arrangement configured to guideline to an image sensor, and
a flash light, said flash light comprising a lens, said lens comprising a lens body, said lens body comprising at least one portion of electroactive material.

According to an embodiment, said lens may further comprise at least two electrodes, said device further comprising a control unit configured to apply a voltage to said at least two electrodes to adapt said lens to a subject to be illuminated by said flash.

According to an embodiment, said device may be selected from the group consisting of a digital camera and a mobile phone.

It should be noted that in optics the term "lens" is sometimes used not only to refer to a single lens but also refer to a lens arrangement comprising a plurality of single lenses. To avoid any confusion, within this application the term "lens" alone refers to a single lens, and an arrangement of a plurality of single lenses is referred to as a "lens arrangement".

BRIEF DESCRIPTION OF THE SEVERAL VIEWS OF THE DRAWING(S)

DETAILED DESCRIPTION OF THE INVENTION

Figure 1:
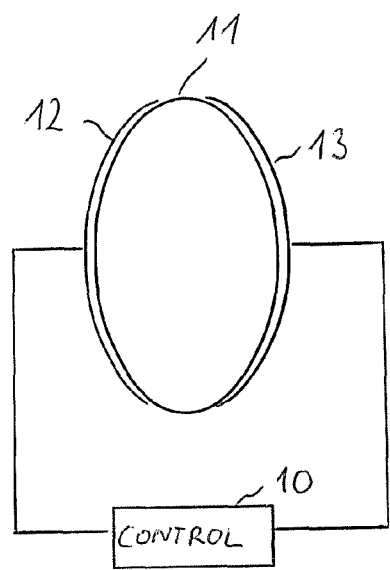
FIG. 1 shows a schematic view of a device comprising a lens according to a first embodiment of the present invention.

In the following, embodiments of the present invention will be described in detail with reference to the attached drawings. It is to be noted that the embodiments described hereinafter are merely intended to illustrate the present invention and are not to be construed as limiting the scope thereof. For example, describing an embodiment comprising a number of features is not intended to indicate that all these features are necessary for practicing the present invention. Instead, other embodiments may comprise different and/or alternative elements, or some elements may be left out entirely. The drawings have been prepared to convey an illustration of some features of some embodiments and are not to be regarded as exact technical drawings. In particular, different elements of the drawings are not necessarily to scale with each other, and the arrangement of elements has been chosen to increase legibility and it is not to be construed to necessarily coincide with an actual arrangement in an actual implementation. Any directional terminology used herein with respect to the drawings, like "left", "right", "top", "bottom", "up" or "down" is merely intended to assist in referring to the drawings and is not to be construed as limiting the present invention to any particular orientation or arrangement of elements. Therefore, the embodiments described herein after and the attached drawings are not to be construed as limitative, and the scope of the present invention is intended to be defined only by the appended claims and equivalents thereof.

Before turning to the description of embodiments, some technical terms used in the following description will be explained.

The term "lens" as used herein generally relates to a single lens of any type, for example a convex lens, a concave lens, a bi-concave lens, a bi-convex lens or a Fresnel lens.

The term "electroactive material" generally relates to a material which changes its shape, size and/or form in response to an applied voltage. Such electroactive materials include piezoelectric crystals, piezoelectric ceramic materials or electroactive polymers (EAPs). Electroactive polymers generally respond to external electrical stimulation, for example an applied voltage, by displaying a significant shape or size displacement. Two major categories of electroactive polymers are electronic and ionic electroactive polymers which have different activation mechanisms. Several sub-categories to the above categories exist, like ferroelectric polymers, dielectric electroactive polymers, liquid elastomer material or ionic polymer gel, just to name a few examples for ionic electroactive polymers.

Turning now to FIG. 1, a device comprising a lens according to a first embodiment and a control unit according to some embodiments is shown.

In FIG. 1, the lens comprises a lens body 11 made of an electroactive material, for example an electroactive polymer. In the embodiment of FIG. 1, the electroactive material is transparent to light of a wavelength for which the lens is intended, for example transparent in the visible range for a lens intended to be used for visible light. A suitable electroactive polymer to be used in the visible range is for example a polyurethane polymer, an acrylic elastomer or an electroactive polymer hydrogel.

In other embodiments, a transparent or non-transparent (i.e. opaque) electroactive polymer in combination with a transparent material may be used. For example, lens body 11 may comprise small portions of opaque electroactive polymer attached to a transparent non-electroactive polymer. In such an embodiment, for example the transparent non-electroactive polymer may be arranged in cube-shaped portions, and an electroactive polymer may be coupled to one or more of the sides of the cube. By applying a voltage, the size or form of the electroactive polymer can be changed, which in turn deforms the transparent non-electroactive polymer and thus changes the optical properties of the lens.

The choice of material may be made depending on the optical requirements.

At lens body 11, electrodes 12 and 13 are applied onto opposing sides. While in FIG. 1, electrodes 12, 13 are shown at some distance from lens body 11, this is only done for greater clarity in the drawings, and electrodes 12, 13 may be applied directly to lens body 11.

In order to allow light to pass through lens body 11, electrodes 12, 13 may be made of a transparent conducting material, i.e. a conducting material transparent to the desired wavelength, or may be made of a grid of conducting materials. An example for the latter case is shown in FIG. 2.

Figure 2:
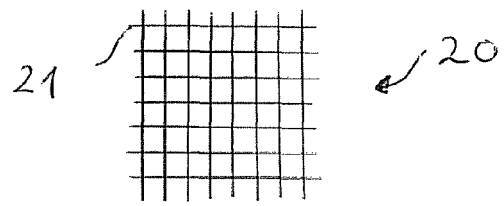
FIG. 2 shows a schematic view of an electrode useable in some embodiments of the present invention.

In FIG. 2, an electrode portion 20 is shown having conductors 21 arranged perpendicular to each other. Conductors 21 may for example be metal conductors. Between conductors 21, light may pass through electrode portion 20.

Returning to FIG. 1, a control unit 10 may be provided to apply a voltage between electrodes 12 and 13. Since lens body 11 is made of an electroactive material, applying a voltage between electrodes 12 and 13 changes the shape of lens body 11 and therefore the optical properties of the lens. In other words, through applying a suitable voltage, control unit 10 is capable of controlling the optical properties of the lens. For example, in FIG. 1, lens body 11 is shown as having a biconvex shape, and the degree of convexity may be adjusted using electrodes 12 and 13.

In the embodiment of FIG. 1, to simplify the explanations, a single electrode 12 and a single electrode 13 are shown. In other embodiments, one or both of electrodes 12 and 13 may comprise a plurality of sub-electrodes isolated from each other, for example a plurality of portions like portion 20 of FIG. 2 spaced apart from each other, to be able to apply different voltages at different portions of lens body 11. In such embodiments, a fine control of the shape of lens body 11 is possible and therefore a fine control of the optical properties. Such embodiments will be discussed further below in more detail.

It should furthermore be noted that the lens body 11 of the embodiments of FIG. 1 may be biconvex without any voltage being applied, the degree of convexity then being adjusted by a voltage applied by control unit 10, or in another embodiment may also be made of a flat piece of electroactive material, the biconvexity then being generated by an applied voltage.

Embodiments of the present invention are not limited to biconvex lenses as shown in FIG. 1. In fact, the control of the lens shape using electroactive materials like electroactive polymers may be used in any desired lens shape, for example plano-convex lenses, plano-concave lenses or also derivates thereof, for example Fresnel lenses derived from the above types of lenses.

Embodiments of the present invention using Fresnel lenses will be explained next.

Figure 3:
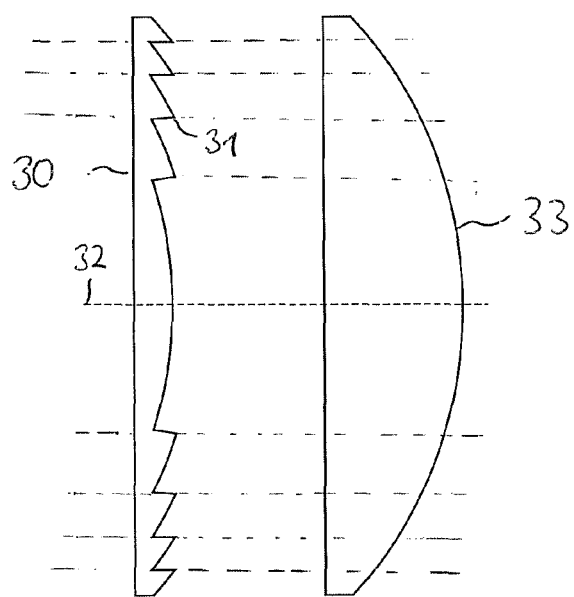
FIG. 3 shows diagrams for explaining the concept of a Fresnel lens.

First, the term Fresnel lens will be explained using an illustrative example with reference to FIGS. 3 and 4. On the right side in FIG. 3, a regular plano-convex lens 33 is shown, i.e. a lens with a planar surface (on the left side of lens 33 in FIG. 3) and a convex surface (on the right side of lens 33 as shown in FIG. 3). On the left side in FIG. 3, a corresponding Fresnel lens 30 is shown. FIG. 3 in particular shows sectional view of Fresnel lens 30 and of lens 33. A dashed line 32 indicates an optical axis of the lenses.

To "generate" Fresnel lens 30 from lens 33, segments of lens 33 as indicated by further dashed lines in FIG. 3 are "moved" towards the planar surface to generate a pattern of sawtooth tips 31. The curvature of the surface of Fresnel lens 30 shown on the right thereof between two sawtooth tips 31, corresponds to the curvature of the convex surface of lens 33. Fresnel lens 30 basically has the same optical properties as lens 33 (basically here meaning apart from effects which may result from the additional edges at sawtooth tips 31), but as can be seen in FIG. 3 is more compact. Therefore, Fresnel lenses are sometimes used in applications where space considerations are important and/or where requirements regarding optical quality are less strict.

Figure 4:
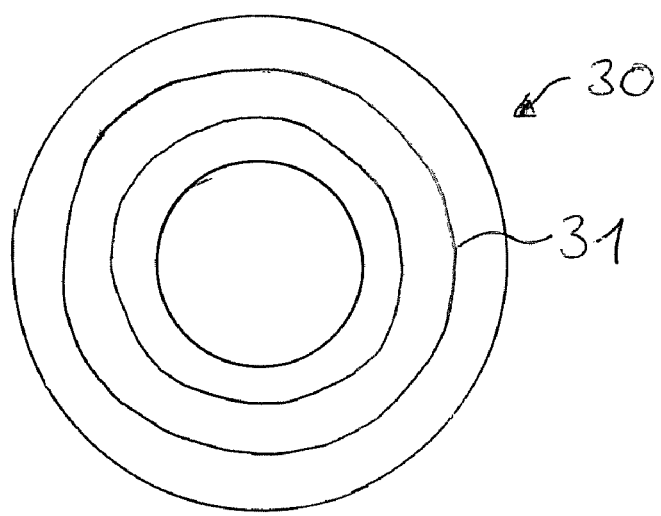
FIG. 4 shows a top view of a Fresnel lens.

FIG. 4 shows a top view of Fresnel lens 30 with sawtooth pattern 31.

It should be noted that in some applications, the complete Fresnel lens as shown in FIG. 4 with its round shape may be used. In other applications, only a portion of the lens, for example rectangular portion of the Fresnel lens shown in FIG. 4, may be used.

As a matter of course, the lenses shown in FIGS. 3 and 4 only serve as examples for illustrating the term Fresnel lens, and other Fresnel lenses having more or less sawtooth tips 31 as shown in FIG. 3 or also Fresnel lenses derived from other types of lenses than plano-convex lenses may be used.

In some embodiments of the present invention, electroactive material is used to generate a Fresnel lens having variable optical properties.

Figures 5A, 5B, 5C:
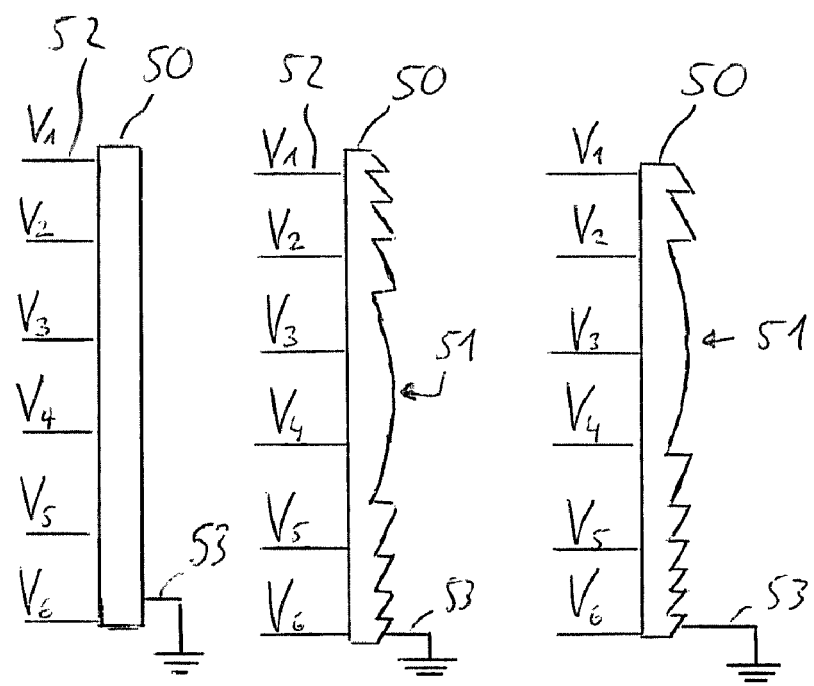
FIGS. 5A to 5C show a lens according to a second embodiment of the present invention in different states.

Such an embodiment will now be explained with reference to FIGS. 5A, 5B and 5C. In FIGS. 5A to 5C, sectional views of the lens according to the second embodiment similar to the view shown in FIG. 3 are depicted. In FIG. 5A, a state of a lens according to an embodiment of the present invention without any voltage being applied is shown. The lens comprises a lens body 50 in the form of an elongate piece of electroactive material, for example a transparent electroactive polymer as explained with reference to FIG. 1.

On a first side, lens body 50 has an electrode 53 covering essentially the complete surface. In the embodiment shown in FIGS. 5A to 5C, electrode 53 is connected to ground.

On a second side opposing the first side, a plurality of electrodes 52, in the simple example depicted in FIGS. 5A to 5C six electrodes, are applied. Electrodes 52 may in particular be concentric electrodes having a semicircular shape arranged essentially similar to the concentric rings shown in FIG. 4, but also may have any other desired shape.

Electrodes 52, 53 may be mesh shaped electrodes like shown in FIG. 2 to allow light to pass between conducting portions or electrodes made of a transparent conducting material.

To electrodes 52, different voltages $V_1$ to $V_6$ may be applied.

The number of six electrodes 52 in FIGS. 5A to 5C serve only as an example, and depending on a desired accuracy of the control of the shape of lens body 50 more or less electrodes 52 may be used. Furthermore, while on the first side in the embodiment shown in FIGS. 5A to 5C a single electrode 53 is applied, in other embodiments also on the first side a plurality of separate electrodes may be provided in order to provide further possibilities for fine tuning the shape of lens body 50 and therefore fine tuning the optical properties thereof.

In FIG. 5B, voltages $V_1$ to $V_6$ are selected to generate a pattern corresponding to a Fresnel lens with a center of the lens (corresponding to the optical axis) being denoted with reference numeral 51. The Fresnel lens thus generated basically corresponds to the Fresnel lens 30 shown in FIG. 3. It should be noted that FIGS. 5A to 5C are only schematic representation, and to reproduce the exact shape of the Fresnel lens shown more than six electrodes 52 may be necessary depending on the accuracy of the reproduction needed.

In FIG. 5C, different voltages $V_1$ to $V_2$ are selected to generate the shape of a Fresnel lens where the center 51 is offset from the middle of the lens.

Voltages $V_1$ to $V_6$ may be generated by a control unit like control unit 10 of FIG. 1.

As can be seen, through selecting different voltages $V_1$ to $V_6$ different lens shapes, for example Fresnel lenses with different properties, may be generated. For example, the focal length of the corresponding lens may be changed, or, as shown in FIGS. 5B and 5C, the position of a center and therefore the optical axis of the lens may be changed.

Lenses with variable optical properties like the ones shown in FIG. 1 or FIGS. 5A to 5C may be used in a variety of applications, for example for photographical applications. Due to their compactness and variability, such lenses, in particular of the Fresnel type as shown in FIGS. 5A to 5C, may be used in mobile electronic devices where space requirements are important. An example for such a mobile electronic device is shown in FIG. 6.

Figure 6:
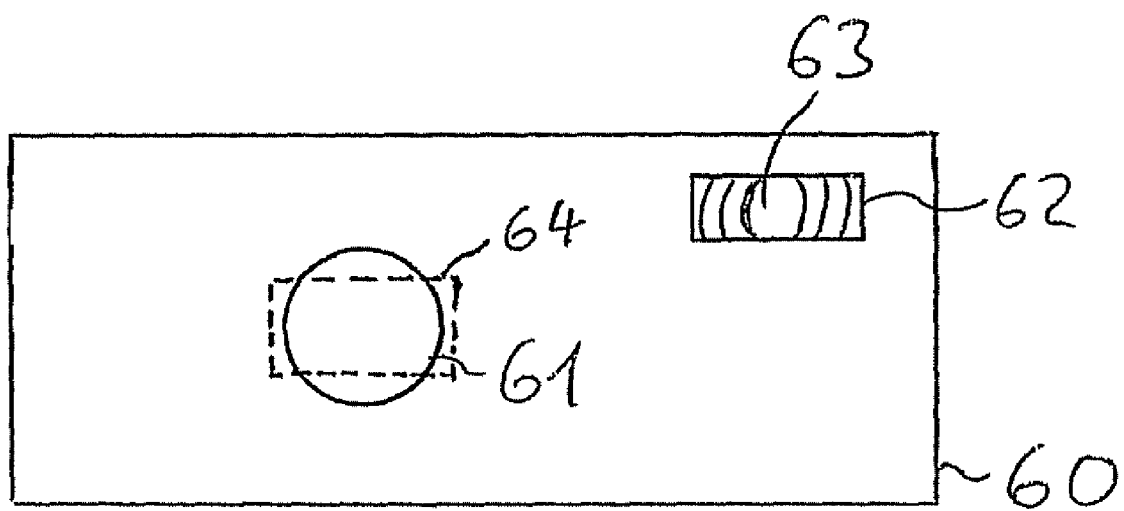
FIG. 6 shows an electronic device according to an embodiment.

In FIG. 6, a mobile electronic device 60 is shown which may be used as a digital camera. However, mobile device 60 is not restricted to digital cameras per se, but may also be for example a mobile phone having additionally the capability of being used as a digital camera.

Mobile device 60 comprises a lens arrangement 61 for focusing light onto an image sensor 64 and a flash light 62. Flash light 62 has a Fresnel lens 63 which in the embodiment of FIG. 6 is a lens made of an electroactive material. In particular, Fresnel lens 63 may be a lens as explained with reference to FIGS. 5A to 5C. Depending on the distance and angular position of a subject of which a picture is to be taken, the focal length and/or center of Fresnel lens 63 may be varied by applying various voltages to an electroactive material thereof such that the illumination of the subject by flash light 62 is optimized.

However, the application of lenses according to embodiments of the present invention is not restricted to flash lights or other illumination devices. For example, also lens arrangement 61 may comprise one or more variable lenses made of an electroactive material or comprising portions made of an electroactive material.

As can be seen, numerous modifications are possible, and therefore the present invention is intended not to be limited by the above described embodiments, but is intended to be limited only by the appended claims and equivalents thereof.

What is claimed is:

1. A lens comprising a lens body, said lens body comprising at least one portion of electroactive material that changes at least one of its shape, size, and form in response to an applied voltage.

2. The lens of claim 1, wherein said lens body consists essentially of said electroactive material.

3. The lens of claim 1, further comprising at least two electrodes configured to apply a voltage to said at least one portion of electroactive material.

4. The lens of claim 3, wherein said at least two electrodes comprise at least one first electrode arranged on a first side of said lens body and a plurality of second electrodes arranged on a second side of said lens body, said second side being opposite said first side.

5. The lens of claim 3, wherein said at least two electrodes are configured to control the shape of said at least one portion of electroactive material to form a Fresnel lens.

6. The lens of claim 3, wherein at least one electrode of said at least two electrodes is selected from the group consisting of a mesh of electrical conductors and a transparent conductor.

7. The lens of claim 1, wherein said at least one portion of electroactive material comprises an electroactive polymer.

8. A device, comprising:
 a lens, said lens comprising a lens body, said lens body comprising at least one portion of electroactive material that changes at least one of its shape, size, and form in response to an applied voltage, and
 at least two electrodes applied to said at least one portion of electroactive material, said device further comprising a control unit coupled to said at least two electrodes and configured to apply a voltage to said at least two electrodes.

9. The device of claim 8, wherein said control unit is configured to shift an optical axis of said lens by applying a voltage to said at least two electrodes.

10. The device of claim 8, wherein said control unit is configured to form said lens to the shape of a Fresnel lens by applying a voltage to said at least two electrodes.

11. The device of claim 8, wherein said at least two electrodes comprise at least one first electrode arranged on a first side of said lens body and a plurality of second electrodes arranged on a second side of said lens body, said second side being opposite said first side.

12. The device of claim 8, comprising a lens arrangement, said lens arrangement comprising said lens and at least one further lens.

13. An electronic device, comprising:
   a lens arrangement configured to guide light to an image sensor, and
   a flash light, said flash light comprising a lens, said lens comprising a lens body, said lens body comprising at least one portion of electroactive material.

14. The device of claim 13, wherein said lens further comprises at least two electrodes, said device further comprising a control unit configured to apply a voltage to said at least two electrodes to adapt said lens to a subject to be illuminated by said flash light.

15. The device of claim 14, wherein said control unit is configured to shift an optical axis of said lens by applying a voltage to said at least two electrodes.

16. The device of claim 14, wherein said control unit is configured to form said lens to the shape of a Fresnel lens by applying a voltage to said at least two electrodes.

17. The device of claim 13, wherein said device is selected from the group consisting of a digital camera and a mobile phone.

* * * * *